United States Patent [19]
Wallace

[11] Patent Number: 4,978,488
[45] Date of Patent: Dec. 18, 1990

[54] CONCRETE BLOCK MOLDING MACHINE HAVING CONTINUOUSLY DRIVEN VIBRATING SHAFT MECHANISM WHICH CAN BE PROGRAMMABLY VIBRATED AND METHOD OF PROGRAMMABLY VIBRATING SUCH MACHINES

[75] Inventor: Mark P. Wallace, Alpena, Mich.

[73] Assignee: Besser Company, Alpena, Mich.

[21] Appl. No.: 479,235

[22] Filed: Feb. 12, 1990

Related U.S. Application Data

[63] Continuation of Ser. No. 255,877, Aug. 1, 1988, abandoned.

[51] Int. Cl.⁵ .......................... B28B 1/08; B28B 3/06; B65G 27/20

[52] U.S. Cl. .......................................... 264/72; 74/61; 74/87; 198/770; 209/366.5; 209/367; 264/297.9; 310/81; 366/128; 425/155; 425/421; 425/432; 425/456

[58] Field of Search ................ 264/72, 69, 297.9, 333, 264/336, 40.1; 425/456, 421, 432, 155; 366/128; 310/81; 209/366.5, 367; 198/770; 74/87, 61

[56] References Cited

U.S. PATENT DOCUMENTS

| | | | |
|---|---|---|---|
| 1,125,500 | 1/1915 | Ensminger . | |
| 2,457,413 | 12/1948 | Stokes et al. . | |
| 2,660,067 | 11/1953 | Glover . | |
| 2,695,523 | 11/1954 | Oswalt . | |
| 2,826,081 | 3/1958 | Campbell . | |
| 2,930,244 | 3/1960 | Hutchinson et al. . | |
| 2,937,537 | 6/1969 | Woll . | |
| 3,059,483 | 10/1962 | Clynch et al. . | |
| 3,104,868 | 9/1963 | Karlstrom et al. . | |
| 3,277,731 | 10/1966 | Pinson . | |
| 3,876,360 | 4/1975 | Arriaga . | |
| 4,079,109 | 3/1978 | Helmrich et al. | 264/72 |
| 4,176,983 | 12/1979 | Gardner . | |
| 4,194,405 | 3/1980 | Reynolds . | |
| 4,235,580 | 11/1980 | Springs . | |
| 4,262,549 | 4/1981 | Schwellenbach . | |
| 4,312,242 | 1/1982 | Wallis . | |
| 4,342,523 | 8/1982 | Salani . | |
| 4,356,736 | 11/1982 | Riedl . | |
| 4,367,054 | 1/1983 | Salani . | |
| 4,395,213 | 7/1983 | Springs et al. | 425/211 |
| 4,481,835 | 11/1984 | Storm . | |
| 4,495,826 | 1/1985 | Musschoot . | |
| 4,523,486 | 6/1985 | Bueno . | |
| 4,546,425 | 10/1985 | Breitholtz . | |
| 4,561,319 | 12/1985 | Lilja . | |
| 4,568,218 | 2/1986 | Orzal . | |
| 4,579,697 | 4/1986 | Takano | 264/72 X |

*Primary Examiner*—Jan H. Silbaugh
*Assistant Examiner*—Karen D. Kutach
*Attorney, Agent, or Firm*—Learman & McCulloch

[57] ABSTRACT

A concrete block molding machine has a vibratible mold box incorporating at least one molding cavity for a cement mixture which is to be densified in the cavity. A continuously driven shaft assembly mounts an eccentric fixed portion and a circumferentially adjustable balancing mass. The shaft assembly has a cylinder with a piston therein, connected to the mass to produce rotary motion of the mass relative to the fixed eccentric portion. A spring of predetermined rate opposes this. The pressure of the fluid introduced is varied to change the amplitude of the vibration imparted during each cycle.

15 Claims, 2 Drawing Sheets

CONCRETE BLOCK MOLDING MACHINE HAVING CONTINUOUSLY DRIVEN VIBRATING SHAFT MECHANISM WHICH CAN BE PROGRAMMABLY VIBRATED AND METHOD OF PROGRAMMABLY VIBRATING SUCH MACHINES

This is a continuation of copending application Ser. No. 07/225,877 filed on Aug. 1, 1988, now abandoned.

BACKGROUND OF THE INVENTION

The present invention is concerned with vibratile molding machines of the character used in the cement block industry for molding concrete building blocks of varying configuration, and other concrete products such as paving stones and the like, from cement mixes which are vibrated to densify them. Various mechanical vibrator assembles have been utilized to eccentrically provide the vibration for such machines and one such vibrating assembly is disclosed, instance, in the present assignee's U.S. Pat. No. 4,312,242 issued Jan. 26, 1980. In conventional concrete block manufacturing machines, the cycle of operation involves the first step of moving the feed box over the empty mold in the machine and starting the vibrating motor. The motor drives a shaft which eccentrically causes the vibration and the motor continues to be driven during a compacting operation, after which a switch is actuated to stop the electric motor which is used as the drive for the system. At this point a stripper is operated to strip the green blocks from the mold and the pallet which has been clamped to the bottom of the mold is released preparatory to transferring it, and the blocks, to a block curing location.

In prior art machines in which the eccentric shafts producing the vibration have been stopped to halt the vibration at the end of the densifying step, large brakes have been required to stop the shafts. Moreover, because of the rapid acceleration and deceleration required in contemporary high production machines, as much as four times the horsepower required to produce the vibration had to be utilized, with the result that much larger motors and shafts were required for reasons other than producing the vibration. In machinery of the type disclosed in the patent mentioned, the vibrating shaft in effect coasts between intervals of operation of the drive motor and so need not be braked and brought up to full speed from a static position. However, the machine still operates by starting and stopping the drive motor and a substantial acceleration of the coasting shaft is required at the time it is desired to produce vibration. Moreover, such prior art machinery is not versatile in the sense that the amplitude of vibration and the forces exerted can be varied during the vibration portion of the cycle.

SUMMARY OF THE INVENTION

The invention is directed to a high speed, concrete products forming machine which can be utilized in production operations for manufacturing a variety of shapes from a variety of aggregates. Certain intensities and patterns of vibration are optimally used for any given mold, shape of product or aggregate mix which is used.

One of the prime objects of the present invention is to provide a system and method which encourages the programming of the best cycle parameters for a particular "run" so that the same parameters can be stored in the memory of a programmable logic controller and used in future runs of a particular product.

Another object of the invention is to provide a system in which the vibrating shaft can be rotated continuously at vibrating speed without the need for intermittent starting, stopping, and braking while providing the capability of changing the amplitude of the vibration during the operating cycle, and even during the product densifying portion of the cycle.

Still another object of the invention is to provide a system of the character described which utilizes a pair of vibrating shaft assemblies which can be so controlled that the vibration occurs in absolute synchronism.

Still a further object of the invention is to provide a system wherein the amplitude of vibration can be varied during the cycle to compensate for the fact that the total weight of the molding system being vibrated changes during the forming cycle.

Still another object of the invention is to design a system of the type described which provides a shaft assembly whose strength is not compromised intermediate its span, and which can more compactly handle the high loads involved in a most efficient and reliable manner.

Another object of the invention is to provide a quieter system which provides a higher density block with much reduced power consumption, and consequently is more economical to operate.

Still a further object of the invention is to provide a system utilizing a spring having a predetermined rate opposing the axial movement of the weight position adjusting piston-cylinder assembly in a manner such that the spring mechanism is operative to restore the vibration inducing mass to a desired or null position.

Other objects and advantages of the invention will be pointed out specifically or will become apparent from the following description when it is considered in conjunction with the appeneded claims and the accompanying drawings.

IN THE DRAWINGS

Figure 1:
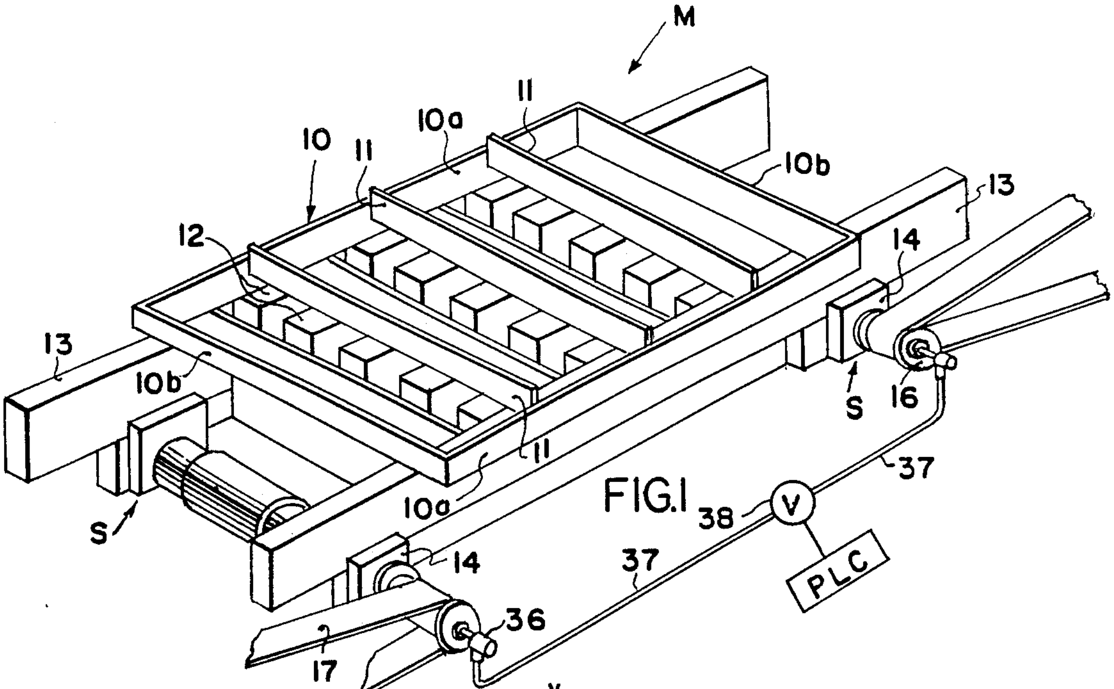
FIG. 1 is a schematic, fragmentary, perspective elevational view of the block making machine, showing the mold and the mold vibrating mechanism thereof.

Referring now more particularly to the accompanying drawing and in the first instance to FIG. 1, a block making machine, generally designated M, of the type disclosed, for instance, in the present assignee's U.S. Pat. Nos. 4,395,213 and 3,833,331, which are incorporated herein by reference, is illustrated fragmentarily. The machine may be considered to include a multi-compartmented mold box, generally designated 10, comprising side members 10*a*, end members 10*b*, and divider or partioning plates 11. In addition, core members 12, such as roof top cores, are provided in the compartments defined by the divider plates 11 for the purpose of forming the core openings in the concrete blocks which may, for example, be formed in this particular mold box.

The lower end of the mold box 10 is, during the forming cycle, closed by a vertically raisable pallet which is releasably clamped to the lower end of the mold box to vibrate with it by a raisable platen having a rubber block top. The upper end of the mold box is open to the reception of concrete mix material from a feed box at the beginning of the cycle. Stripper members are utilized in the usual manner at the end of the cycle to push the blocks formed from the mold as the pallet lowers to a conveyor which moves the green block to a curing area such as a kiln.

As shown, the mold box 10 has mold supporting side arms 13. Spanning the ends of the side arms 13 are twin vibrator shaft assemblies, each generally designated S, and being shown more particularly in FIGS. 2 and 3. As illustrated, a shaft assembly S is provided at each end of the mold box and both vibrating shaft assemblies are controlled to operate synchronously so that one end of the mold is not vibrated more intensely than the other. This is necessary to ensure uniformity in the blocks being formed in the mold. As FIG. 2 particularly indicates, the frame members 13 support bearings 14 which journal each shaft S for rotation. Each shaft assembly S incorporates a shaft 15 which, at one end, has a solenoid operated variator drive sheave 16 fixed to it in the usual manner for receiving a drive belt 17. Drive belts 17 are driven by an electric or other suitable motor in the usual manner at the same speed of rotation but the speed of rotation of each may be adjusted equally with adjustment of the sheaves 16. Mounted on each of the drive shafts 15 to rotate therewith, are opposite end hubs or stubs 18 and 19 which, it will be noted in FIG. 2 have portions eccentrically disposed relative to the axis x to provide offset weight portions 18*a* and 19*a*. Locking ring assemblies 20 secured by bolts 21 are provided in end recessed portions 22 in the hub ends 18 and 19 to unite the shaft 15 and hubs 18 and 19 for conjoint rotation. The stub shaft portions 18 and 19 are also recessed as at 23 to receive roller bearings 24 supporting a circumferentially movable collar 25 which also has a weight portion eccentric with respect to axis x. The offset weight portion 25*a* of collar 25 is equal in weight to the combined offset weights 18*a* and 19*a* of stub shaft portions 18 and 19. The offset weights of the collar 25 and stubs 18 and 19, thus, balance one another in the FIG. 2 position when the offset weight portion 25*a* is 180° removed from the offset weight portions 18*a* and 19*a* of stub shafts 18 and 19.

The inner end of stub shaft 19 is concentrically bored to form a cylinder C in which the reduced end 26*a* of a shouldered piston 26 is received. At its opposite end, piston 26 is annularly recessed as at 27 to provide a spring well for one end of a coil spring 28 whose opposite end is received in a spring well 29 provided in the stub shaft 18. Axial guide pins (not shown) may be provided for the spring 28.

Figure 2:
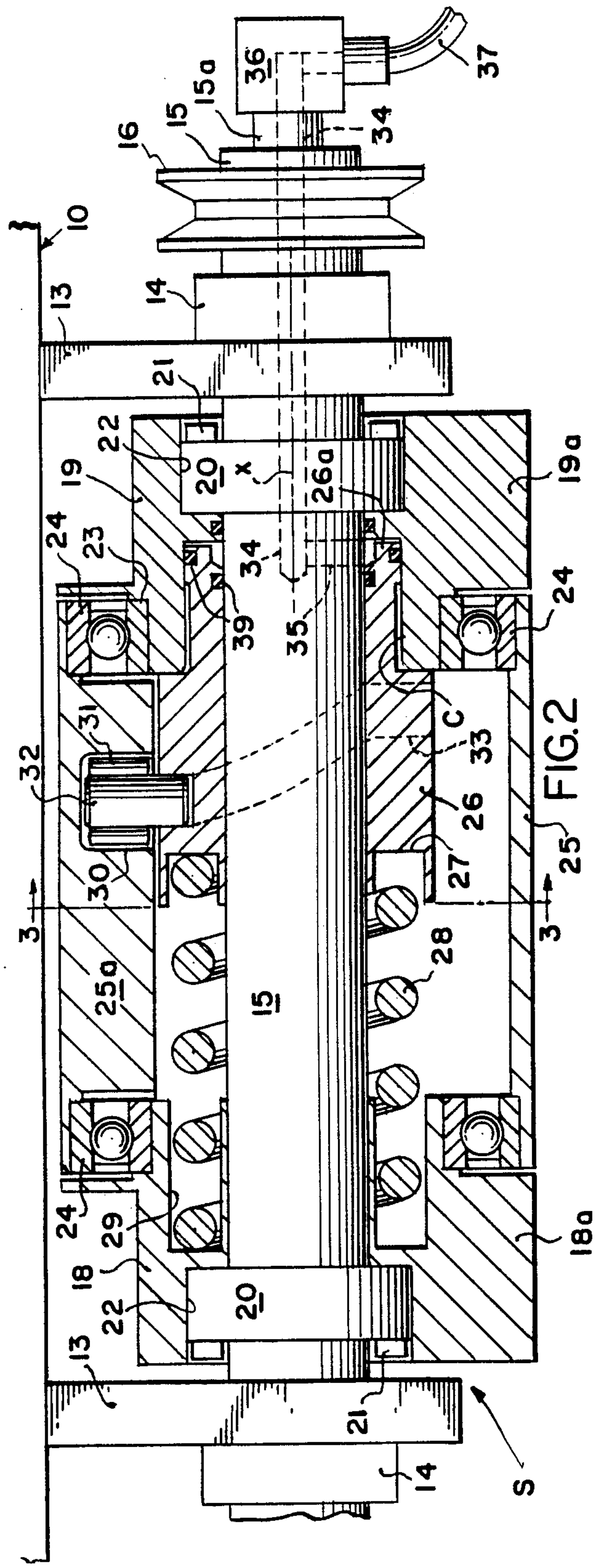
FIG. 2 is a fragmentary, sectional, elevational view, illustrating one of the identical mold vibrating shaft assemblies which is employed, in a null mode.
Figure 3:
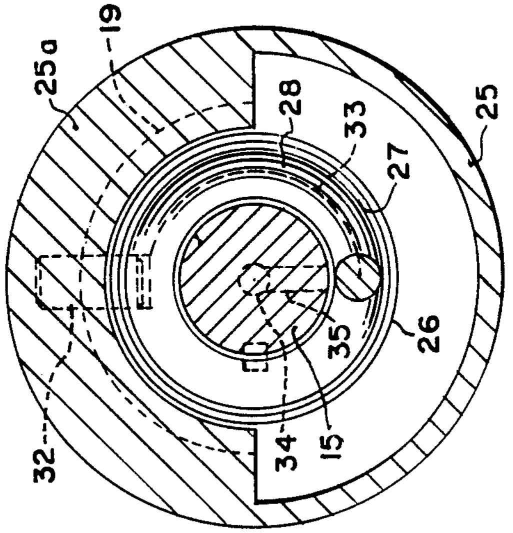
FIG. 3 is a transverse sectional view thereof, taken on the line 3—3 of FIG. 2.

Weight collar 25 is rotatable on bearings 24, from a position 180° removed from the eccentric portions of shafts 18 and 19 in which the balanced condition is achieved and no vibration is transmitted to bearings 14, through 180°, for example, to a position in which maximum vibration is transmitted to the bearings 14 because the combined eccentric weight portions 18, 19, and 25 are in a position of circumferential alignment. Provided in the collar 25, is a bore 30 receiving a roller 31 mounted on a pin 32 whose inner end is received in a helical groove 33 provided in the piston member 26. The helical groove 33 extends 180° in piston 26 to rotate collar member 25 from a null position to a position in which maximum vibration is achieved, when the piston 26 is moved from the null position in which it is shown in FIG. 2 from right to left against the bias of spring 28.

Provided in the shaft 15, is an axial bore 34 connecting with the radial bore 35 leading to the one end 26*b* of cylinder C. It is to be understood that air under a controlled pressure may be transmitted through a stationary coupling 36 within which reduced shaft end 15*a* is rotatable. While air is disclosed as the pressure transmitting medium it should be understood that other suitable fluids may be employed. As FIGS. 1 and 2 indicate, an air hose 37 leading to each shaft assembly S from air dispensing valve 38 is employed to supply air under the pressure desired for a particular operation to the cylinder C. Solenoid operated valve V, which has ports venting to atmosphere, is controlled by a programmable logic controller PLC. Spring 28 is of a predetermined rate, and its compression to the desired degree to achieve the intensity of vibration desired, is determined by the pressure of the air admitted via ports 34 and 35. This pressure is varied by the control 38 during each cycle of the machine when it is determined, for instance, to operate the machine in accordance with a cycle such as disclosed in FIG. 4 (which will be later described). Seal rings 39 ar provided to seal the cylinder C. The capability that the machine enjoys of achieving optimum intensity of vibration for the particular operation being performed, provides a machine which can often be adjusted to decrease the noise of operation of the machine, where this is desirable. The machine is capable of vibration at an increasing intensity during the filling of the mold from a feed box FB to achieve the desired uniformity of filling which promotes uniformity in the compaction portion of the cycle.

THE OPERATION

Figure 4:
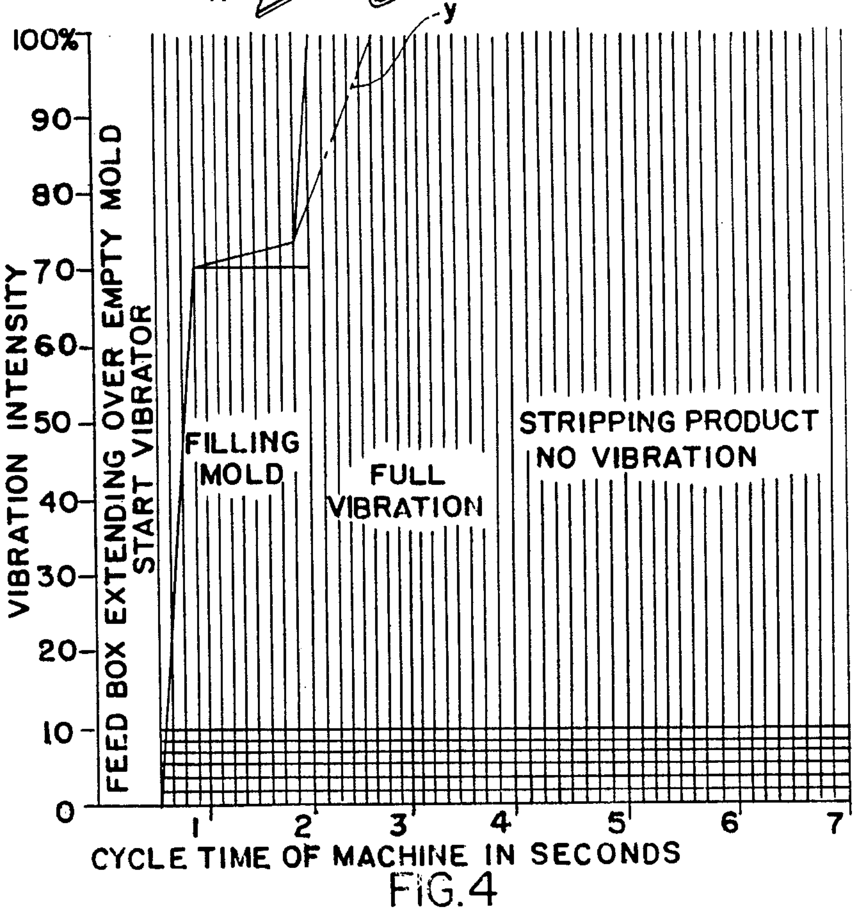
FIG. 4 is a graph indicating vibration intensity in terms of percentage of maximum amplitude versus cycle time.

A typical cycle of operation is disclosed in FIG. 4 where it will be noted that approximately a half a second is required to move the material feed box over the empty mold. During this time, each drive shaft 15 is being continuously driven at the selected speed by drive sheave 16 and the collar 25 of each shaft assembly S is in the position indicated in FIG. 2 in which the eccentric weight portion 25*a* of collar 25 counterbalances the eccentric weight portions 18*a* and 19*a* of stub shafts 18 and 19 which rotate with the shaft 15. When the feed box is in position, air under the predesignated pressure, is fed from the valve 38 through ports 34 and 35 to move the pistons 26 from right to left in FIG. 2 to the extent of 70% of their permissable movement This revolves the collar 25 through about 126° and achieves an intensity of vibration equivalent to about 70% of maximum, due to the composite offset effect of the eccentric portion 25*a* of collar 25 with respect to the eccentric portions 18*a* and 19*a* of stub shafts 18 and 19. This intensity is increased slightly before rising to full intensity. The spring 28 of predetermined rate controls the axial position of piston 26. With this system as for instance, opposed to a double-acting hydraulic system, there is no need to return oil to a reservoir (which takes time). Further the presence of air in a hydraulic line, variations in oil temperature, and line leaks, which all can affect the metered volume are not problems. The control achieved is particularly critical in machines in which a pair of shafts must operate in synchronism and a common valve needs to be used to ensure that they actuate at the same instant.

FIG. 4 demonstrates that filing is completed in two seconds and the air pressure admitted through lines 34 and 35 is increased to move the piston 26 further from right to left to a position in which the eccentric weight portion of 25*a* of collar 25 and the eccentric weight portions 18*a* and 19*a* of stub shafts 18 and 19 are in alignment so that maximum vibration is exerted during rotation of the shaft assemblies S. At the end of four seconds the supply of air through passages 34 and 35 is cut off, and the air pressure in these lines is bled to atmosphere via valve 38 so that spring 28 restores the piston 26 to the FIG. 2 position with weight portions 25*a,* 18*b* and 19*b* now in a balanced or null position. No vibration is transmitted via the bearings 14 to the mold box 10 at this time when stripping of the product from the mold is being accomplished, even though the shaft 15 continues to be driven at the designated speed. With the present construction, the motor driving belts 17 need not be started and stopped, and no brakes need be utilized. The vibration obtained is virtually vertical in character with no destabilizing lateral characteristics.

While one cycle has been illustrated, many others will be used. Typically filling will take place in from $\frac{3}{4}$ to $2\frac{1}{2}$ seconds and compaction from $1\frac{1}{2}$ to $3\frac{1}{2}$ seconds. The speed of rotation of shafts 15 can also be varied by the PLC via adjustment of the sheaves 16 to change the frequency of vibration. The program for a given operation will consider both the frequency and amplitude of vibration.

In an alternate operation which is indicated by the chain lines in FIG. 4, the intensity of vibration during the time of compacting vibration may be varied in the manner indicated at y, for example, for a particular product. The change may be made while the machine is operating.

While one embodiment of the invention has been described in detail, it will be apparent to those skilled in the art that the disclosed embodiment may be modified. Therefore, the foregoing description in all aspects is to be considered exemplary rather than limiting in any way, and the true scope of the invention is that defined in the following claims.

I claim:

1. In a concrete block molding machine having a vibratible frame with a mold box incorporating molding cavities therein for a concrete mix which is to be densified in said cavities; the combination comprising:

a. at least one vibration causing shaft assembly supported on said frame to impart vibrating motion thereto;

b. bearings on said frame for journaling the ends of said shaft assembly;

c. drive means connected with said shaft assembly for driving said shaft assembly in continuous rotation;

d. said shaft assembly comprising opposite end stubs having circumferentially fixed portions eccentric to the axis of rotation of said shaft assembly and a circumferentially movable balancing mass mounted for rotation on said stubs for movement between circumferential positions in which said mass substantially balances the centrifugal force imparted eccentrically by said eccentric portions of said stubs to produce a null level of vibration and a second position in which densifying vibration is produced, said mass in the first position being substantially 180° opposite said eccentric portions on said stubs;

e. one of said stubs being recessed to provide a piston cylinder with a piston therein;

f. means interconnecting said piston and mass to produce rotary motion of said mass relative to said stubs with axial movement of said piston in said cylinder, to move said mass from a balancing position in relation to said eccentric portions toward a radially offset position;

g. spring means of predetermined rate opposing axial movement of said piston and operative to move said piston in an opposite direction to restores said piston and mass when pressure on said piston is released;

h. fluid pressure supply means for supplying fluid under a predetermined pressure to one end of said piston in opposition to said spring means to control the axial position of said piston and consequentially the circumferential position of said mass relative to said eccentric portions of said stubs via said spring;

i. said spring means being a coil spring and said piston and said opposite stub being recessed to provide opposing spring wells for the opposite ends of said coil spring; and j. said shaft assembly including a radially inner shaft portion, and said stubs and piston being bored to receive it; said piston and coil spring being in a surrounding position relative to said radially inner shaft portion.

2. The invention of claim 1 wherein said shaft portion has radially enlarged sections at its ends and said stubs have enlarged recesses to receive them.

3. The invention of claim 1 wherein said fluid pressure supply means is a source of air under pressure.

4. The invention of claim 1 wherein a pair of said vibration causing shaft assemblies are mounted by said frame at opposite ends thereof; and a valve connected between said supply means and said piston cylinder in each stub provides an equal pressure at the same instant to said piston cylinder in each stub.

5. The invention of claim 1 wherein said interconnecting means comprises a helical slot in said piston and a depending pin protruding from said mass, said slot extending substantially 180°.

6. In a concrete block molding machine having a vibratible frame with a mold box incorporating molding cavities therein for a concrete mix which is to be densified in said cavities; the combination comprising:

a. at least one vibration causing shaft assembly supported on said frame to impart vibrating motion thereto;

b. bearings on said frame for journaling the ends of said shaft assembly;

c. drive means connected with said shaft assembly for driving said shaft assembly in continuous rotation;

d. said shaft assembly comprising opposite end stubs having circumferential portions eccentric to the axis of rotation of said shaft assembly and a circumferentially movable balancing mass mounted for rotation on said stubs for movement between circumferential positions in which said mass substantially balances the centrifugal force imparted eccentrically by said eccentric portions of said stubs to produce a null level of vibration and a second position in which densifying vibration is produced, said mass in the first position being substantially 180° opposite said eccentric portions on said stubs;

e. one of said stubs being recessed to provide a piston cylinder with a piston therein;

f. means interconnecting said piston and mass to produce rotary motion of said mass relative to said stubs with axial movement of said piston in said cylinder, to move said mass from a balancing position in relation to said eccentric portions toward a radially offset position;

g. spring means of predetermined rate opposing axial movement of said piston and operative to move said piston in an opposite direction to restore said piston and mass when pressure on said piston is released;

h. fluid pressure supply means for supplying fluid under a predetermined pressure to one end of said piston in opposition to said spring means to control the axial position of said piston and consequentially the circumferential position of said mass relative to said eccentric portions of said stubs via said spring;

i. said spring means including a coil spring, and said piston and said opposite stub being recessed to provide opposing spring seats for the opposite ends of said coil spring; and j. said shaft assembly including a radially inner shaft portion, and said stubs and piston being bored to receive said shaft portion; said piston and coil spring being in a surrounding position relative to said shaft portion, and said drive means being connected to said inner shaft portion to impart rotative driving force thereto.

7. A method of molding concrete blocks by programmably vibrating a concrete block molding machine having a vibratible frame with a mold box incorporating at least one molding cavity for a concrete mixture which is to be densified in said cavity; at least one vibration-causing shaft assembly supported on said frame to impart vibrating motion thereto; bearings on said frame for journaling the ends of said shaft assembly; a drive connected with said shaft assembly for driving said shaft assembly in continuous rotation; said shaft assembly mounting a first portion eccentric to the axis of said shaft assembly and a circumferentially movable balancing mass mounted for relative rotation with said first eccentric portion on said shaft assembly between circumferential positions in a first of which said mass substantially balances the centrifigal force imparted eccentrically by said first eccentric portion to produce a null level of vibration and a second position in which densifying vibration is produced, said mass in said first position being substantially 180° opposite said first eccentric portion; said shaft assembly having a cylinder with a piston thereon, one of which is axially movable relative to the other; means interconnecting said axially movable one of said cylinder and piston with said mass to produce rotary motion of said mass in one circumferential direction relative to said first eccentric portion to move said mass from a balancing position relative to said first eccentric portion toward a radially offset position; spring means of predetermined rate opposing axial movement of said movable one of said piston and cylinder and operative to move it in an opposite direction to restore said mass; and fluid pressure supply means for supplying fluid under a predetermined pressure to said cylinder in opposition to said spring means to control the axial position of said movable one of said piston and cylinder and consequentially the circumferential position of said mass relative to said first eccentric portion via said spring means, said method comprising the steps a. supplying said concrete mixture to said molding cavity for densification during a predetermined time period of a cycle;

b. continuously driving said shaft assembly at a predetermined speed;

c. cyclically over said predetermined time period successively introducing fluid under a predetermined variable pressure to said cylinder and piston in opposition to the force exerted by said spring means to relatively move said mass and said first eccentric portion from substantially a position of 180° circumferential opposition in which the vibration produced is substantially null to a substantial vibration producing position out of substantial centrifugal balance to produce densifying vibration having an intensity during a predetermined first portion of said time period in which said mold cavity is supplied with said concrete mixture to be molded;

d. thereafter introducing additional fluid under pressure to said cylinder and piston in opposition to said force exerted by said spring to relatively move said mass and said first eccentric portion to a position further removed from said position of 180° circumferential opposition in which said densifying vibration produced is of greater intensity during a second portion of said time period than during said first portion of said time period, and in which said second portion of said time period a final densifying of said concrete mixture supplied to said mold cavity occurs to produce a molded product; and;

e. then removing said fluid introduced to said cylinder and piston to restore said mass to a position of 180° circumferential opposition such that said vibration produced is substantially null and stripping said molded product from said mold box during a third portion of said predetermined time period of said cycle.

8. The method of claim 7 including the step of varying said pressure of said fluid introduced to change the amplitude of said vibration imparted to said vibratible frame and mold box during each time period.

9. The method of claim 8 including the step of changing the speed of rotation of said shaft assembly at the end of said cycle while said shaft assembly is being driven.

10. The method of claim 9 wherein said first portion of said time period is from $\frac{3}{4}$ to $2\frac{1}{2}$ seconds in a time cycle of approximately seven seconds.

11. The method of claim 10 wherein said second portion of said time period is $1\frac{1}{2}$ to $3\frac{1}{2}$ seconds.

12. The method of claim 7 wherein said cycle is timed, and the amount of fluid introduced is controlled by a programmable logic controller.

13. The method of claim 12 wherein more than one shaft assembly is provided and one of said shaft assemblies is provided at each end of said mold box to vibrate each end of said mold box, and said fluid is fed equally and simultaneously to said cylinder and piston of each shaft assembly in synchronism.

14. The method defined in claim 7 wherein said second portion of said time period is of longer duration than said first portion of said time period.

15. The method defined in claim 7 wherein said first, second, and third portions of said time period are programmably controlled in duration, and the amount of fluid introduced is also varied by a programmable logic controller.

* * * * *

UNITED STATES PATENT AND TRADEMARK OFFICE

CERTIFICATE OF CORRECTION

PATENT NO. : 4,978,488

DATED : December 18, 1990

INVENTOR(S) : Mark P. Wallace

It is certified that error appears in the above-identified patent and that said Letters Patent is hereby corrected as shown below:

Column 1, line 14 change "cement" to -- concrete --; line 21, after "disclosed" insert -- for --.

Column 5, line 1, change "filing" to -- filling --.

Column 6, line 11 change "restores" to -- restore --.

Column 7, line 68 after "steps" insert -- of: --.

Signed and Sealed this

Thirtieth Day of June, 1992

*Attest:*

DOUGLAS B. COMER

*Attesting Officer*

*Acting Commissioner of Patents and Trademarks*